United States Patent [19]
Jordan et al.

[11] Patent Number: 5,676,020
[45] Date of Patent: Oct. 14, 1997

[54] HAND-ROTATABLE BICYCLE GEAR SHIFT ACTUATOR WITH OVERSHIFT RETURN

[75] Inventors: Brian Jordan; Sam Patterson, both of Chicago, Ill.

[73] Assignee: SRAM Corporation, Chicago, Ill.

[21] Appl. No.: 497,205

[22] Filed: Jun. 30, 1995

[51] Int. Cl.[6] .............................. B62K 23/04; G05G 5/06
[52] U.S. Cl. ........................ 74/475; 74/489; 74/502.2; 74/527
[58] Field of Search ...................... 74/475, 502.2, 74/527, 489

[56] References Cited

U.S. PATENT DOCUMENTS

| | | | |
|---|---|---|---|
| 4,938,733 | 7/1990 | Patterson | 474/80 X |
| 5,197,927 | 3/1993 | Patterson et al. | 474/80 X |
| 5,213,005 | 5/1993 | Nagano | 74/502.2 |
| 5,438,889 | 8/1995 | Tagawa | 74/475 |
| 5,476,019 | 12/1995 | Cheever et al. | 74/475 X |
| 5,524,501 | 6/1996 | Patterson et al. | 74/475 |
| 5,588,925 | 12/1996 | Arbeiter et al. | 74/502.2 X |

*Primary Examiner*—Charles A. Marmor
*Assistant Examiner*—Troy Grabow
*Attorney, Agent, or Firm*—Ralph C. Francis

[57] ABSTRACT

A hand-operated shift actuator (16) displaces a derailleur control cable (22). The actuator (16) includes a stationary member (60) that is affixed relative to a bicycle handlebar (44). Rotation of the rotating member (62) causes the control cable (22) to be displaced, thus actuating the derailleur (24) to which the control cable (22) is attached. A plurality of detent positions (104-115) each correspond to a derailleur overshift position. The rotating member (62) is rotatable in a first direction to any of these detent positions (104-114). A spring-loaded overshift corrector (90, 142) urges the rotating member (62) from an overshift position in a second direction to a respective new desired sprocket center position when the rotating member (62) is released by the hand of the rider.

13 Claims, 11 Drawing Sheets

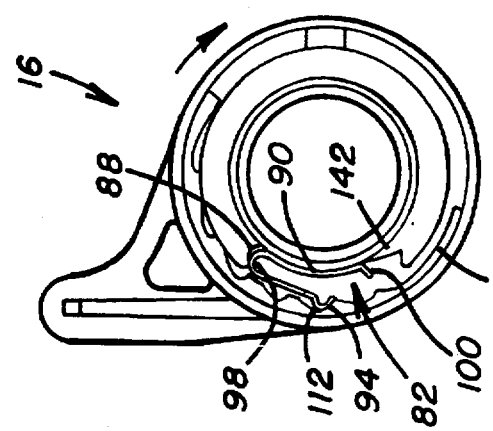
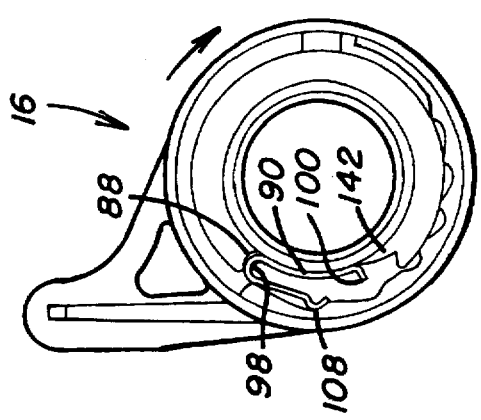
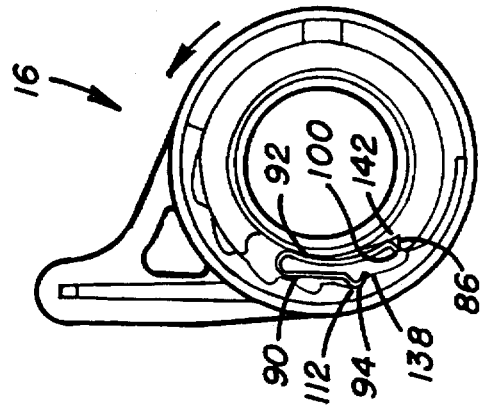
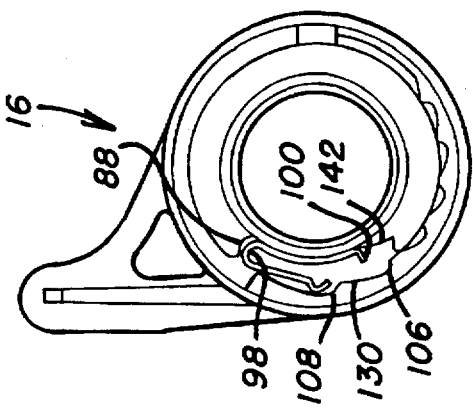
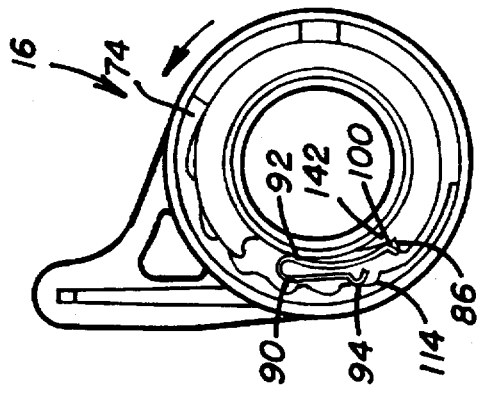
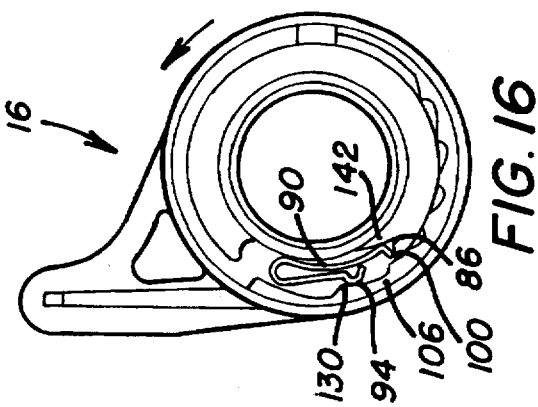
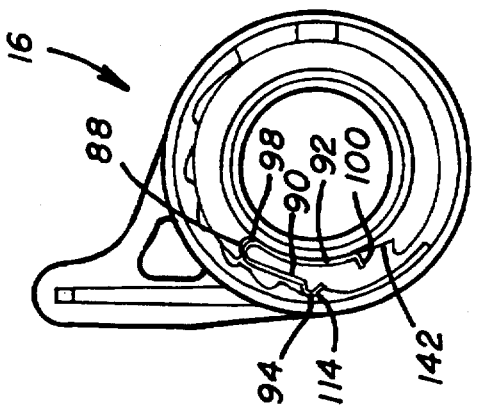
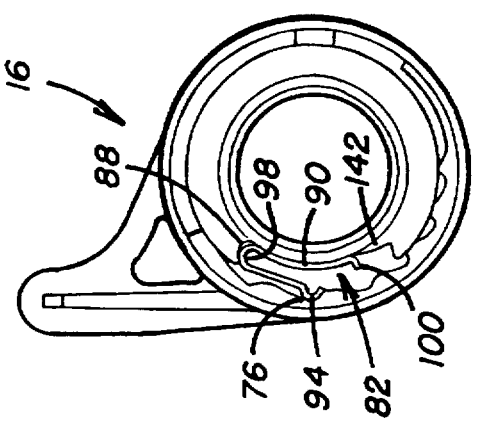

# 5,676,020

HAND-ROTATABLE BICYCLE GEAR SHIFT ACTUATOR WITH OVERSHIFT RETURN

TECHNICAL FIELD OF THE INVENTION

The present invention relates to shifters for multiple-gear bicycles, and more particularly to a hand-rotatable shift actuator for actuating a derailleur and for returning the derailleur from an overshift position to a sprocket-center position.

BACKGROUND OF THE INVENTION

In conventional derailleur-actuated multiple-gear bicycles, a derailleur is used to transfer a bicycle drive chain from one freewheel sprocket to another freewheel sprocket. The derailleur moves in response to displacement of a derailleur control cable. Pulling the control cable causes the rear derailleur to shift the drive chain to a larger and more inboard sprocket, producing a lower gear; releasing the control cable permits a cable-tensioning derailleur return spring to shift the drive chain to a smaller and more outboard sprocket, producing a higher gear.

Ideally, a derailleur shift would be actuated between sprocket center positions, that is, from perfect alignment with one sprocket to perfect alignment with another sprocket. In practice, however, at least some derailleurs require overshift to accomplish a downshifting function (that is, a shift from a smaller sprocket to a larger sprocket). In these systems, the derailleur is shifted from a central sprocket position on a smaller sprocket in an inboard direction slightly beyond the selected larger sprocket to an overshift position; this helps displace the chain by enough that it will engage the desired gear. Some means must then be used to return the shifter or shift actuator to a central position on the new sprocket.

Conventional lever actuated shifting systems facilitate shifter mechanism return by cable tension alone or by a combination of cable tension and other spring-loaded means within the shift actuator. Conventional twist-shift actuated shifting systems facilitate shifter mechanism return by cable tension alone. Further, several twist-shift actuators have used a loaded spring to assist cable pull which further interferes with return to sprocket center position.

Shift actuators, such as the above, which do not use a forcible method of return from the overshift position to sprocket center position have numerous disadvantages (e.g., binding, non-uniform return). A need therefore exists to provide a more effective and reliable method of overshift return.

The distance between the derailleur upper guide wheel or "jockey wheel" and the sprocket with which the guide wheel is aligned is commonly referred to as chain gap. Generally, the more chain gap there is between the target sprocket and the upper guide wheel, the more overshift will be needed to effect a downshifting operation. Throughout a sprocket set, the chain gap is generally not constant, and the amount of overshift necessary therefore varies from sprocket to sprocket. A need thus also exists for a means to vary the amount of overshift caused by a detented shift actuator.

SUMMARY OF THE INVENTION

An object of the present invention is to provide a hand-operated shift actuator for displacing a derailleur control cable which includes (i) variable overshift capabilities and (ii) optimum means for compensating (i.e., return) for the overshift conditions. The shift actuator includes a stationary member affixed relative to a shifting station on a bicycle, and a rotating member which is hand-rotatable relative to the stationary member. Rotation of the rotating member causes the derailleur control cable to be displaced, thus actuating the derailleur affixed to the other end of the control cable.

The shift actuator includes a plurality of detent positions, each of which corresponds to a derailleur sprocket center position, with the rotating member being hand-rotatable in a first direction (i.e. downshifting direction) to any of these detent positions. A spring-loaded overshift corrector is incorporated into the shift actuator to urge the rotating member in a second direction opposite the first direction to a respective desired shift position corresponding to sprocket center when the rider releases his or her hand from the rotating member.

In a preferred embodiment, the stationary member of the shift actuator includes a mandrel affixed to the shifting station, which preferably is a site on the bicycle handlebar. A detent spring is provided which has a base and an indexing projection. The rotating member includes an engagement portion having a plurality of depressions, any one of which may be engaged by the indexing projection of the detent spring. A cavity in the mandrel receives the base of the detent spring. The mandrel cavity has a floor with a length between opposed stops or sidewalls therefore which generally exceeds the length of the detent spring base.

The spring is engaged in compression between the inner surface of the rotating member and the cavity floor. During rotation of the rotating member in a down shift or cable pulling direction, the base of the spring slides up a ramp in the cavity floor. The rotating member continues to be rotated until the indexing projection of the spring engages the one of the depressions selected by the rider. After the rider releases the rotating member, the compressed spring will move with the rotating member as a unit off the ramp in an upshift or cable releasing direction. This in turn will displace the cable such that the derailleur returns from an overshift position to the optimum sprocket center position for the selected sprocket.

According to another aspect of the invention, the amount of overshift may be varied from sprocket to sprocket. This is accomplished by incorporating a plurality of "lands or flats" (preferably, concavely arcuate surfaces of substantially constant radius) between the depressions on the inner surface of the rotating member. When a rider applies sufficient torque to the rotating member in the downshift or cable pulling direction, the indexing projection of the spring will come out of registration with a depression, and will begin engaging an adjacent flat. Since at this moment the base of the spring is in engagement with the ramp, the compression of the spring will cause the spring to move, across the flat to the next depression, without any further angular displacement of the rotating member. A "click" or detent is thus achieved earlier and with less angular displacement of the rotating member, and this in turn means that the amount of cable displaced is less and the amount of derailleur overshift is reduced. By varying the length of the flat or land associated with a particular depression, the amount of overshift reduction for the corresponding sprocket may be varied.

The present invention thus confers the technical advantages of (1) aiding in derailleur overshift return and (2) creating a means by which the amount of overshift may be varied. The action of the hand-operated shift actuator is thus configurable to more exactly match derailleur shifting requirements.

BRIEF DESCRIPTION OF THE DRAWINGS

Further aspects of the invention and their advantages may be discerned in the following detailed description when read in conjunction with the drawings, in which:

FIGS. 11–14 are sectional views of a shift actuator showing successive stages in a shift with a large amount of overshift; and FIGS. 15–18 are sectional views of a shift actuator, showing successive stages in a shift with a small amount of overshift.

DETAILED DESCRIPTION OF THE INVENTION

Figure 1:
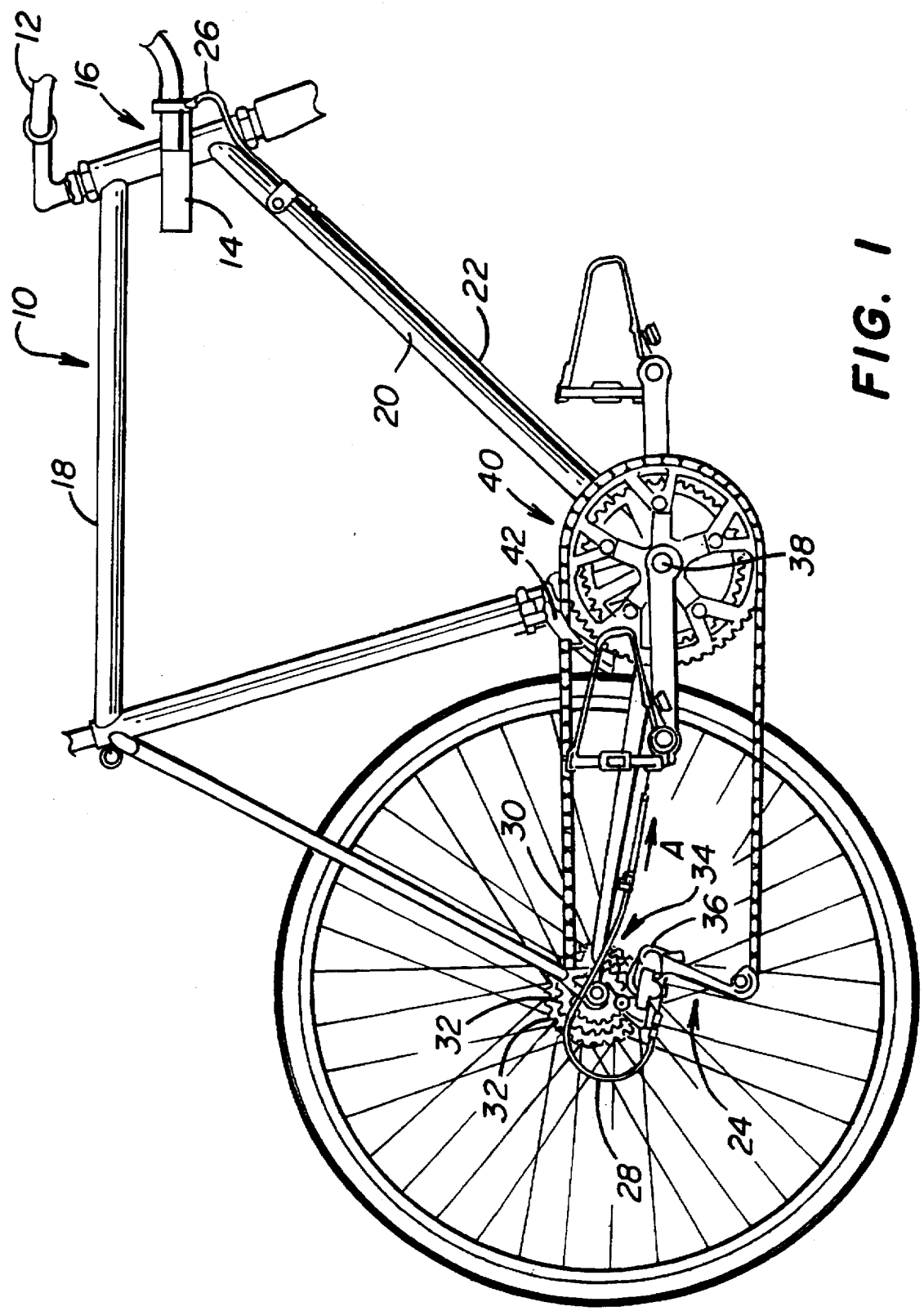
FIG. 1 is a partial elevational view of a "road bike" incorporating the invention.

Referring first to FIG. 1, a bicycle is indicated generally at 10. The illustrated bicycle 10 is a "road bike" with dropped handlebars 12 (incompletely shown). Mounted on the end of the handlebar 12 is a stationary elastomeric grip 14. A hand-operated shift actuator according to the invention, indicated generally at 16, is preferably mounted on the handlebar 12 to be coaxial with it and to be inboard from the stationary grip 14. While the shift actuator 16 is preferred to be mounted on the handlebar 12, it can be mounted at any other shifting station accessible to the rider of the bicycle; for example, it could be mounted on tubes 18 or 20.

As discussed in detail below, the rear derailleur shift actuator 16 is operable to linearly displace a derailleur control cable 22 in order to change the sprocket position of a derailleur indicated generally at 24. The derailleur control cable 22 is typically of the Bowden type, having a sheath segment 26 at the upper end as well as a terminal sheath segment 28 near its terminus with the derailleur 24. The remote end of the coated cable 22 is commonly attached as by a clamp (not shown) to derailleur 24. The derailleur 24, as controlled by the control cable 22, operates to shift a drive chain 30 between selected ones of a plurality of sprockets 32 mounted together on a freewheel 34.

When the shift actuator 16 displaces the control cable 22 in the direction denoted by A, the derailleur 24 will shift the drive chain 30 from a smaller sprocket "down" to a larger, more inboard sprocket. Many derailleur designs require an amount of overshift when executing a downshift; that is, the derailleur 24 upper guide wheel 36 (see FIG. 3b) must travel inboard beyond the vertical axis 54 of the selected sprocket 52 (hereinafter referred to as "sprocket center position") to which the drive chain 30 is to be shifted. Once the shifting has commenced, the conventional derailleur 24 upper guide wheel 36 returns to the sprocket center position by the action of a derailleur return spring (not shown). However, until the upper guide wheel 36 of the derailleur returns to the center of the targeted sprocket, the drive chain 30 experiences undesirable chatter and rasp due to the misalignment of the chain 30 with respect to the sprocket. It is therefore an objective of the present invention to make the return from the overshift position to a sprocket center position as quickly and effectively as possible.

As further illustrated in FIG. 1, the drive chain 30 is generally powered by a crank 38 on which are mounted chainrings 40. Although two such chainrings 40 are shown for road bike 10, a "mountain bike" will typically have three chainrings 40, including one of smaller size than the two shown in FIG. 1. As discussed in detail below, a front derailleur 42 is also provided which is actuated by a front derailleur shift actuator 46 via a front derailleur control cable 48 to select one of the chainrings 40 (see FIG. 2). As will be recognized by one having skill in the art, the present invention is also applicable in instances where overshift is required for the front derailleur 42.

Figure 2:
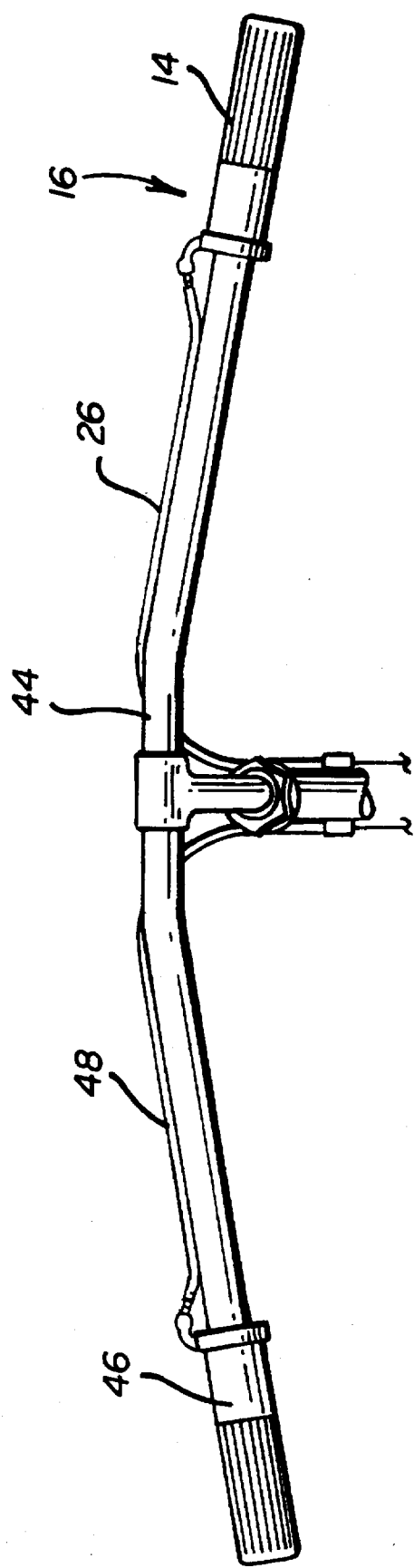
FIG. 2 is a plan view of a pair of "mountain bike" handlebars on which the invention has been mounted.

Referring now to FIG. 2 there is illustrated a typical "mountain bike" handlebar 44. For mountain bikes, it is preferred that the rear derailleur shift actuator 16 be coaxially mounted on the handlebar 44 inboard of a stationary grip 14. As discussed above, shift actuator 16 controls the rear derailleur 24 of the bicycle (see FIG. 1); rear derailleur shift actuator 46 is operable to linearly displace the front derailleur control cable 48, which in turn actuates the front derailleur 42. Shift actuators 16, 46 are typically operable via hand rotation. Such actuators are discussed in detail in U.S. Pat. Nos. 5,197,927, 4,938,733 and 4,900,291 and supplied by Sram Corporation under the trade names "Grip Shift®" and "Quick Shift™", the disclosures of which are incorporated herein by reference.

Figure 3C:
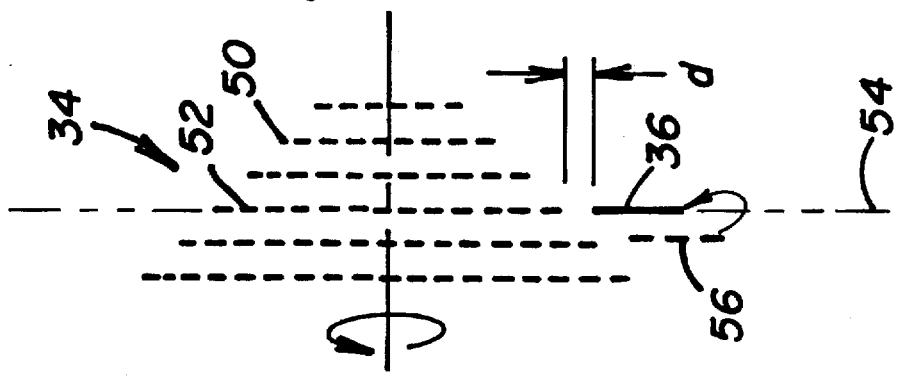
FIGS. 3a–3c are schematic diagrams illustrating a derailleur overshift and return.
Figure 3B:
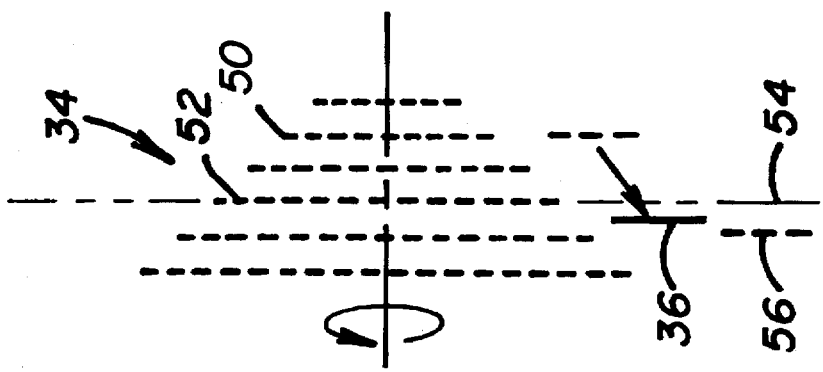
Figure 3A:
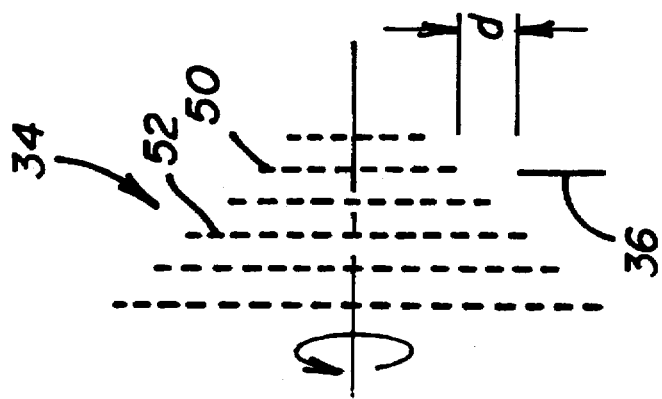

FIGS. 3a–3c schematically illustrate a rear derailleur overshift and return. In FIG. 3a, the upper guide wheel 36 is in a sprocket center position with respect to sprocket 50. If a rider desires to "down shift" two sprockets to sprocket 52 via an overshift (see FIG. 3b), the control cable must actuate the derailleur such that the upper guide wheel 36 shifts to an "overshift" position (indicated by dashed line 56) which is inboard of the sprocket center position 54 of the newly selected sprocket 52. Referring now to FIG. 3c, after the overshift position is achieved and the shift has commenced, the upper guide wheel 36 of the derailleur will return to the sprocket center position 54 from the overshift position 56. It is a principal object of the present invention to make this overshift return as effective and reliable as possible.

FIGS. 3a–3c also illustrate a chain gap d which occurs between the margin of the sprocket 50 and the freewheel 36. This chain gap d varies from sprocket to sprocket. As the chain gap d decreases, the amount of overshift required to move the chain from one sprocket to another also decreases. Hence, as shown in FIG. 3c, the chain gap d between upper guide wheel 36 and sprocket 52 may be considerably less than the chain gap between sprocket 50 and upper guide wheel 36, as shown in FIG. 3a. It is therefore a further object of the invention to provide a method by which the overshift may be varied as a function of the identity of the sprocket selected.

Figure 4:
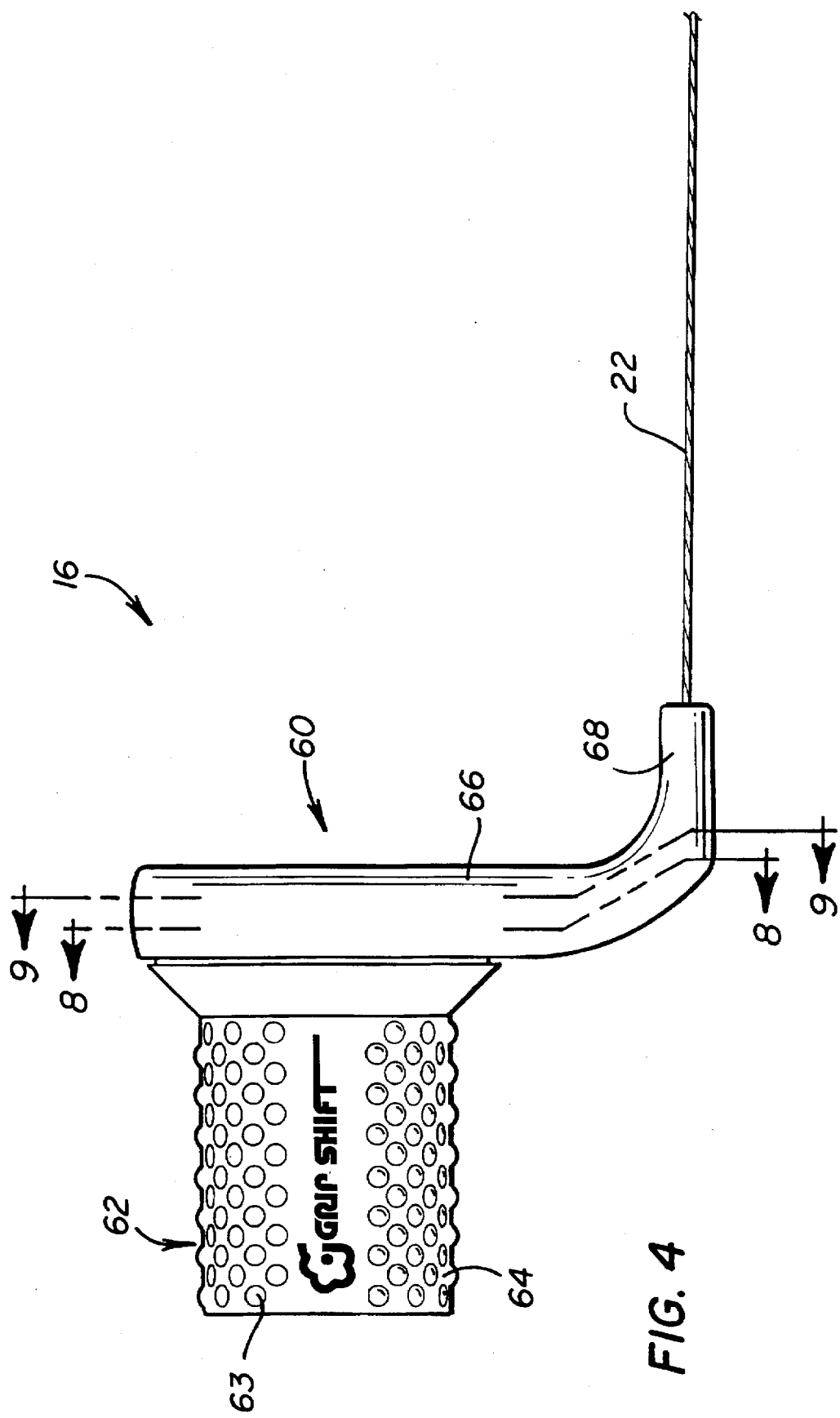
FIG. 4 is an elevational view of a hand-operated shift actuator according to the invention.

FIG. 4 is an elevational view of a hand-rotatable shift actuator 16 according to the invention. The shift actuator 16 has two principal components: a stationary member indicated generally at 60 and a rotating member indicating generally at 62. The rotating member 62 has an external grip 64 which preferably is formed of an elastomeric material and may have various gripping elements 63 formed thereon. Stationary member 60 includes a housing 66 and an extension 68 thereof through which the rear derailleur control cable 22 is threaded. The stationary member 60 is affixed to the bicycle handlebar 44 or 12 (see FIGS. 1 and 2) as by means of a clamp (not shown). The rotating member 62 preferably rotates coaxially with respect to the handlebar on which it is mounted.

Figure 5:
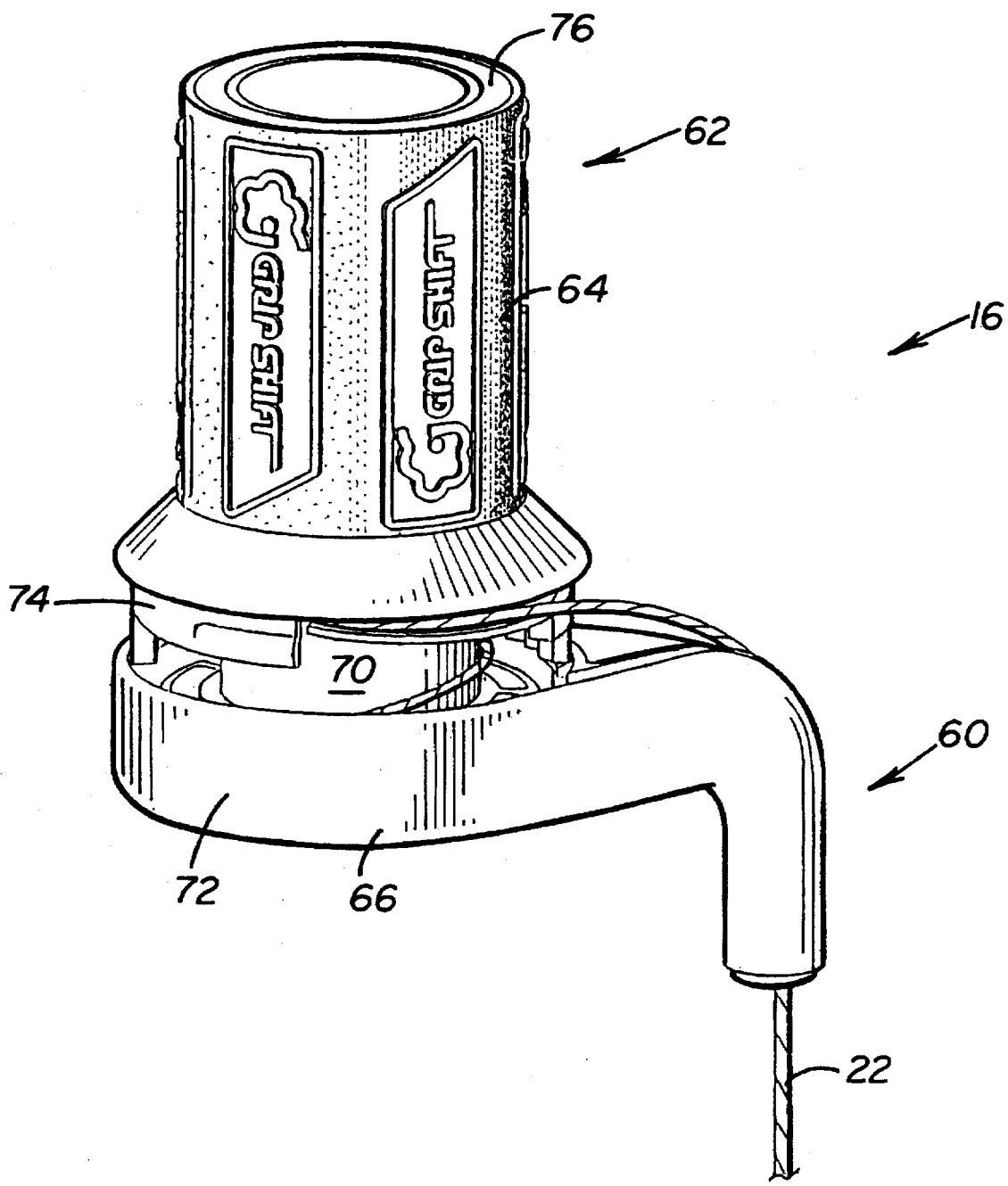
FIG. 5 is a partially exploded isometric view of the hand-operated shift actuator shown in FIG. 4.

FIG. 5 is a partially exploded view of the shift actuator 16 with a separation between the rotating member 62 and the stationary member 60. As shown, the derailleur control cable 22 is looped around a mandrel 70 which preferably is integral with the housing 66. The mandrel 70 is preferably a cylindrical member that is coaxial with the handlebar. Disposed within a cylindrical housing sidewall 72 is a detent circle 74 of the rotating member 62. The detent circle 74 is a substantially cylindrical segment which angularly extends around a portion of the circle with which it is congruent. Housing 66, mandrel 70 and detent circle 74 are preferably formed of a hard machineable or injection modable polymer such as NYLON®, produced by DuPont. The detent circle 74 is preferably formed as a portion of coaxial sleeve 76 of the rotating member 62; the elastomeric grip 64 is disposed over the sleeve 76. Derailleur cable 22 is also shown which is typically fabricated of stranded steel wire.

Figure 6:
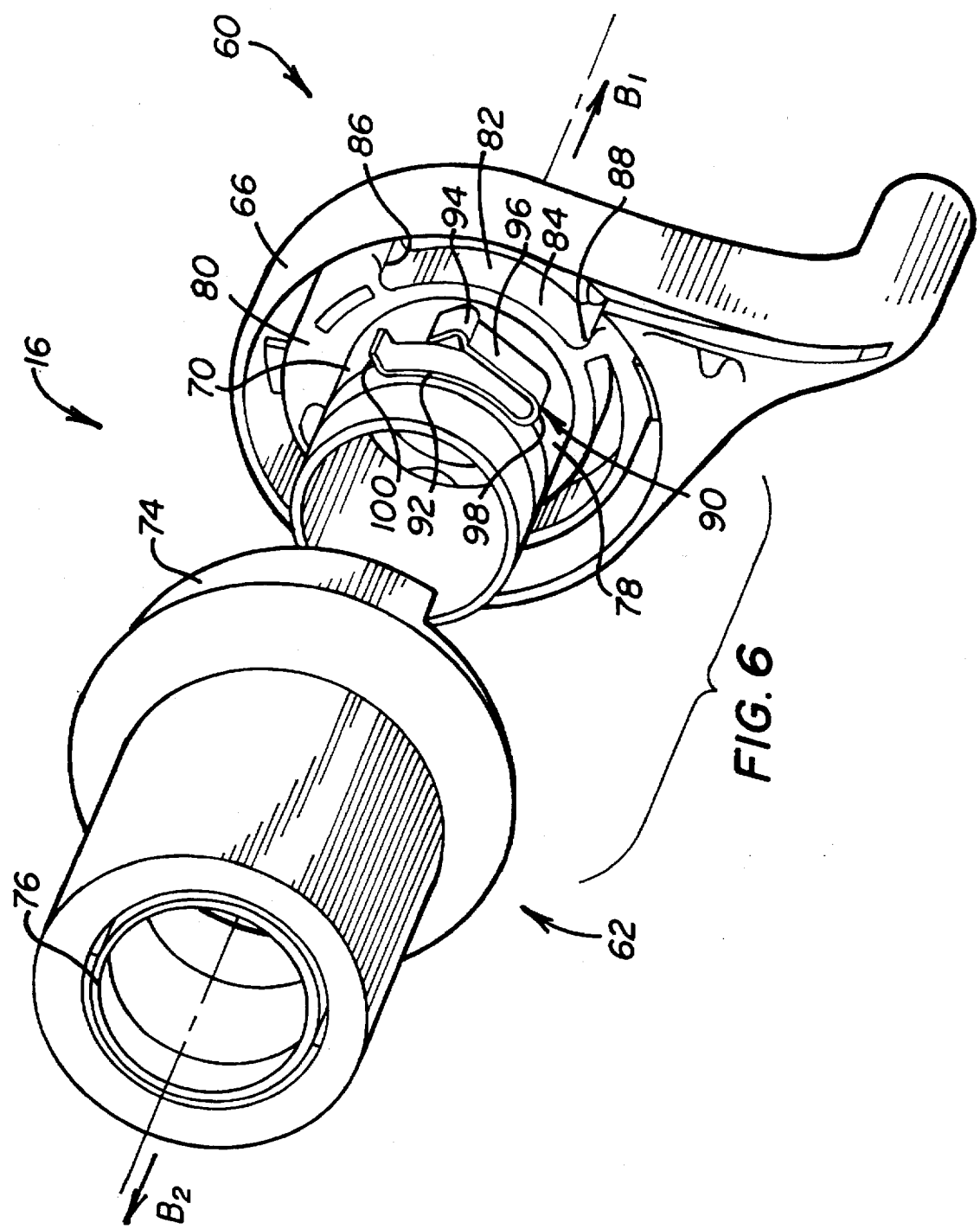
FIG. 6 is an exploded isometric view of the shift actuator of FIGS. 4 and 5 taken from a second angle.

FIG. 6 is an exploded isometric view of the shift actuator 16 taken from a second angle where the inboard direction (of the handlebar) is denoted by arrow $B_1$ and the outboard direction is denoted by arrow $B_2$. As illllustrated in FIG. 6, the mandrel 70 includes a bushing 78 on which the rotating member sleeve 76 rotates. A collar or circumferential flange 80 is preferably integrally formed with the mandrel 70 and is disposed in an inboard direction from the bushing 78. The collar 80 includes an arcuately shaped receptacle 82 which has a convexly arcuate floor 84, a first sidewall 86 and a second sidewall 88.

The receptacle 82, formed by the rigid collar 80, is adapted to receive and support a detent spring indicated generally at 90. The detent spring 90, which preferably is formed of steel, has a base member 92 and a radially outwardly extending indexing projection 94. In the illustrated embodiment, the indexing projection 94 is connected to the base 92 by an arm 96, such that the indexing projection 94 will exhibit a cantilever spring action with respect to the base 92 around a pivot formed by an end 98. An opposed end 100 has a raised portion which is adaptable to coact with sidewall or stop 86 of the mandrel 70. According to the invention, the circumferential distance between stops 86 and 88 is substantially larger than the circumferential distance between ends 98 and 100 of the detent spring 90. Other forms of the detent spring 90 may be employed within the scope of this invention, provided they include a base 92 which is slidable between stops 86 and 88, and an indexing projection 94 which is adaptable to be spring-loaded in a radial outward direction from the base 92.

Figure 7:
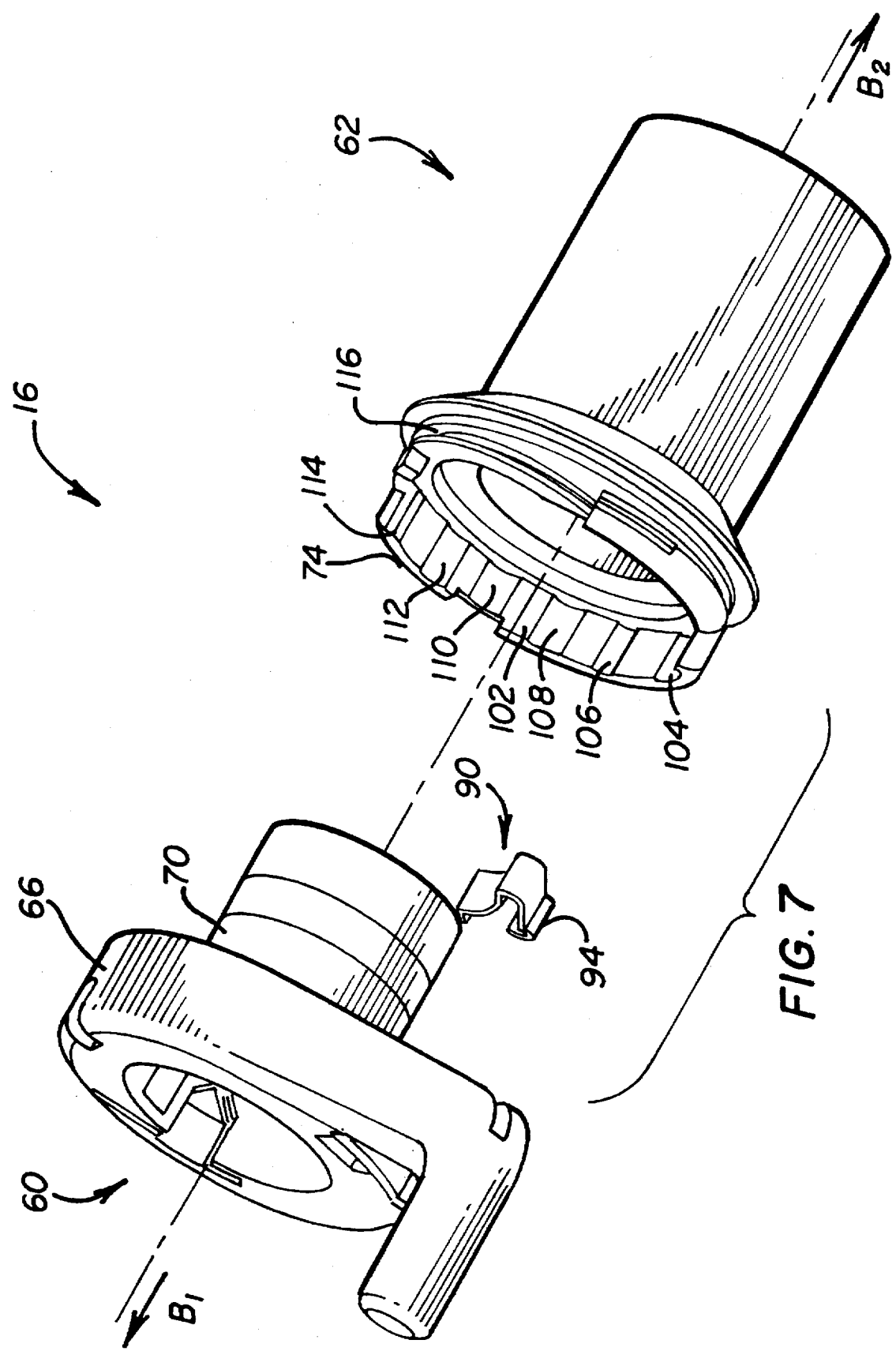
FIG. 7 is an exploded isometric view of the shift actuator of FIGS. 4–6 taken from a third angle.

FIG. 7 is an isometric exploded view taken from a third direction of the shift actuator 16. This view illustrates the inner surface 102 of the detent circle 74, which generally conforms to a cylindrical segment. The inner surface 102 includes a plurality of detents, notches or depressions 104-114, which are adapted to receive the indexing projection 94 of the detent spring 90. Also illustrated in FIG. 7, and disposed in an outboard direction from the detent circle 74, is a track 116 for the derailleur control cable 22.

Figure 8:
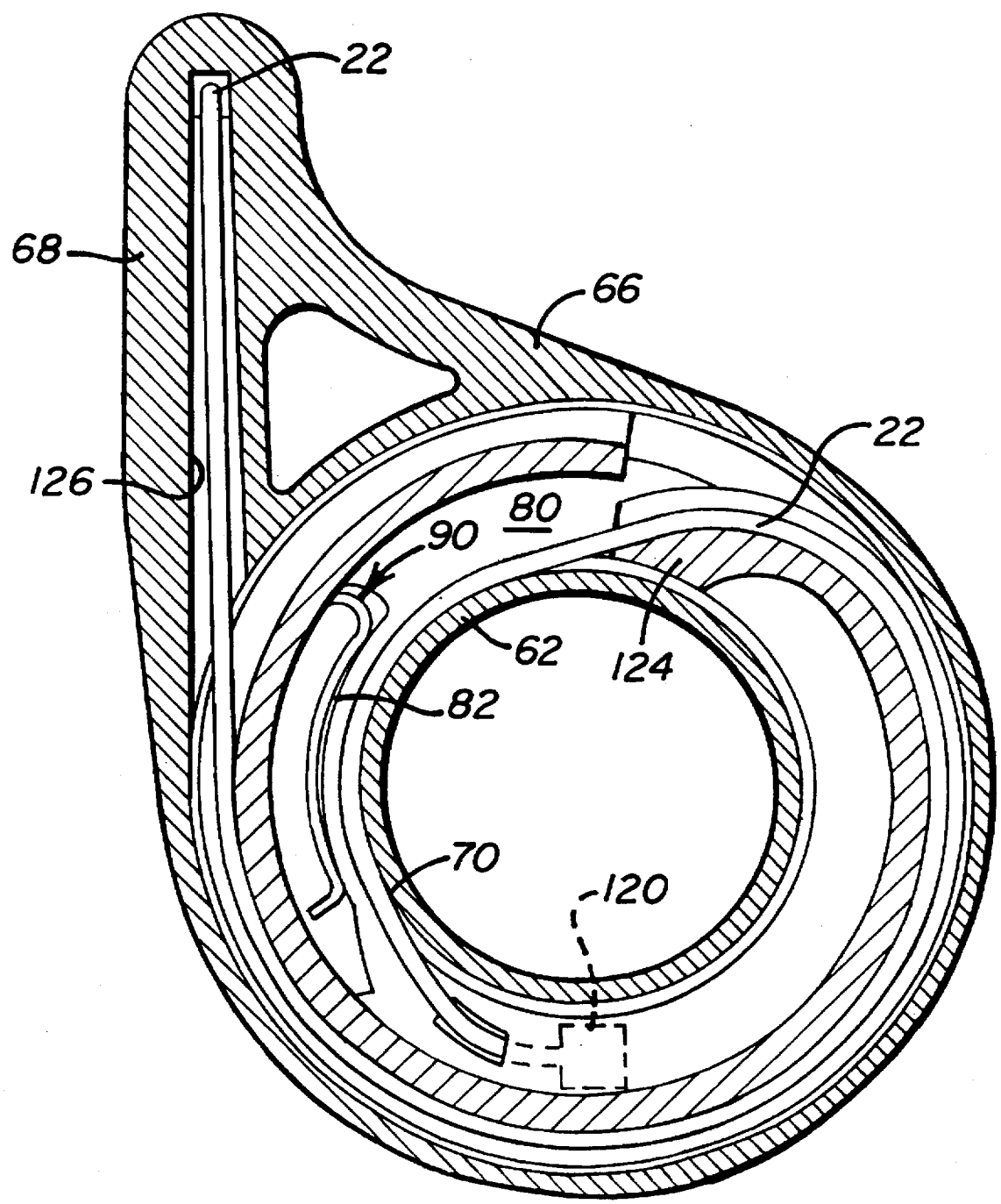
FIG. 8 is a cross-sectional view of an assembled shift actuator, taken substantially along line 8—8 of FIG. 4.

FIG. 8 is a sectional view taken substantially along line 8—8 of FIG. 4. In the embodiment illustrated in FIGS. 5–8, commonly referred to as a "shovel cam" shift actuator, an end of the derailleur control cable 22 is affixed to member 60 via a terminal bead 120, shown in phantom. As illustrated in FIG. 8, the control cable 22 wraps around the mandrel 70 and engages a cam lobe 124 of rotating member 62. The cam lobe 124 is designed and adapted to increase the dispositional radius of the control cable 22 in an outward direction. The cable 22 is entrained on the cam 124 until the cable 22 exits through a bore 126 in the housing extension 68. Details of various "shovel cam" designs are provided in U.S. Pat. No. 5,102,372, which is fully incorporated by reference herein.

Figure 9:
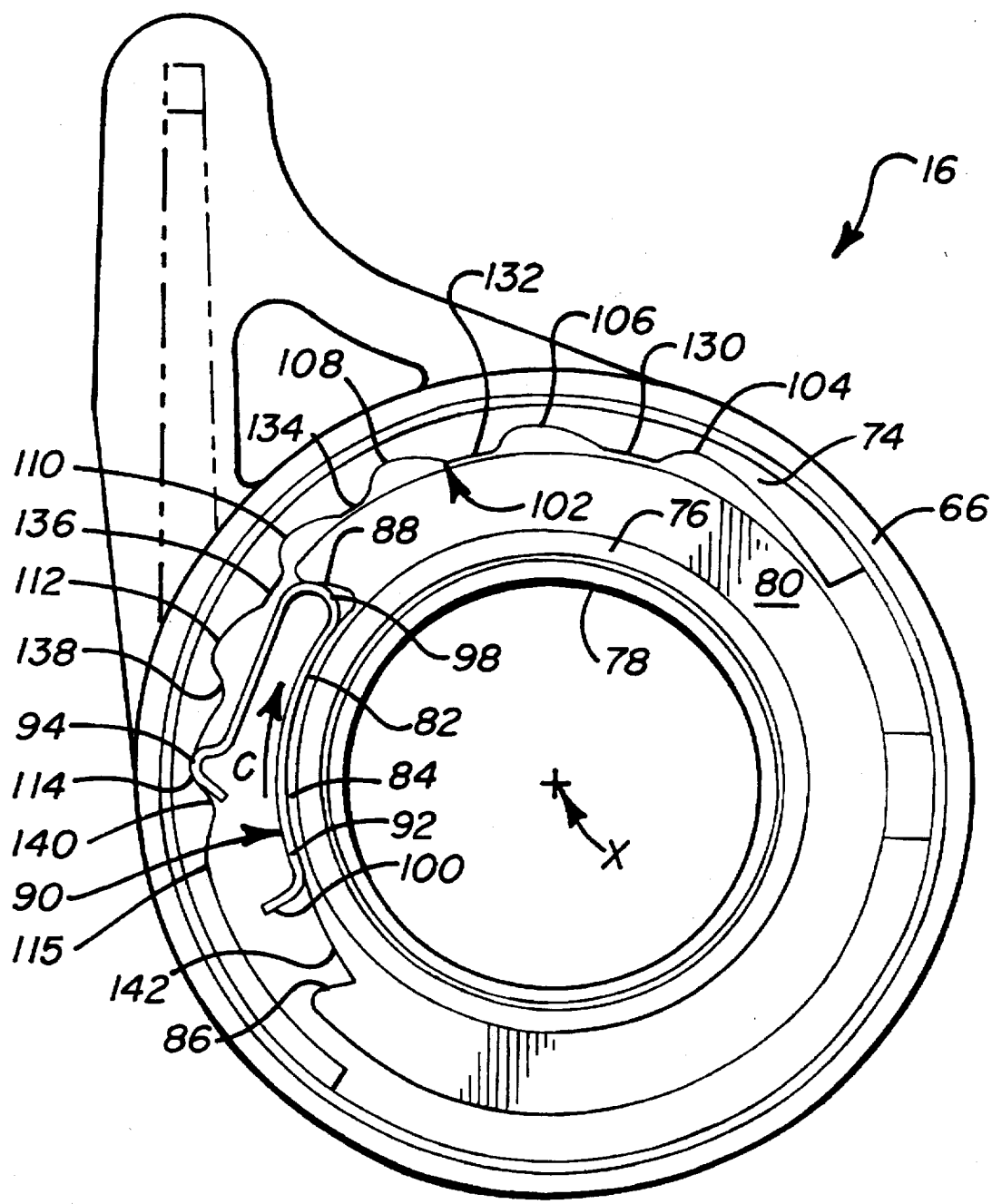
FIG. 9 is a cross-sectional view of an assembled shift actuator, taken substantially along line 9—9 of FIG. 4.

FIG. 9 is a cross-sectional view taken substantially along line 9—9 of FIG. 4 and is taken along a plane which is slightly more inboard than the plane shown in FIG. 8. As illustrated in FIG. 9, disposed between the detents or depressions 104-115 are a plurality of lands or plateaus 130-140 of a substantially constant radial distance from the central axis X. According to the invention, the angular extent of these lands or plateaus 130-140 varies according to the identity of the depressions with which they are associated. In the embodiment illustrated in FIGS. 9–17, detent or depression 104 is associated with an inboardmost sprocket on the freewheel 34, while detent or depression 115 is associated with the smallest, outboardmost sprocket of that freewheel (see FIG. 1). Referring to FIG. 9, land or plateau 130 preferably subtends a relatively large arc, while "plateau" 140 is merely a crest between associated detents or notches 114 and 115. The angular extent of lands 132, 134, 136 and 138 generally decrease proportionately between lands 130 and 140, preferably linearly. As will be recognized by one skilled in the art, various land or plateau configurations and/or positions may be employed within the slope of the present invention.

However, a key feature of the detent circle 74 and its inner surface 102 is that the angles of the sides with respect to an intersecting radius of each of the depressions 104-115 are substantially different from each other. In an upshifting direction, where the shift actuator 16 is releasing cable so as to be taken up by a derailleur return spring, the slopes are relatively abrupt. In a downshifting direction, where the shift actuator 16 is operating against the derailleur return spring instead of in aid of it, the depression slopes are relatively gradual. The noted configuration results in the detent shifting resistance experienced by the rider in an upshifting direction being substantially equal to the resistance experienced in a downshifting direction.

As further illustrated in FIG. 9, the floor 84 of the spring cavity or receptacle 82 includes a portion of substantially constant radius as measured from axis X. However, a key feature of the present invention is that floor 84 also includes a "squirt ramp" segment 142. The squirt ramp segment 142 preferably ramps radially outwardly from the general radius of floor 84 to an increased radius at the point it intersects with stop 86. When the actuator 16 is released, the ramp 142 will urge the spring 90 in a clockwise direction (denoted by arrow C) until the base 92 of the spring 90 is completely displaced off ramp 142 and the pivot end 98 is abutted against the opposed stop 88. The ramp 142 thus produces a torque component from the compressive force exerted by the spring 90 between the detent circle 74 and the spring receptacle 82. This torque component will urge the spring to go clockwise and, since the indexing projection 94 of the spring 90 is engaged with a selected one of the detents 104-115, will also rotate the rotating member 62 in a clockwise direction.

Figure 10:
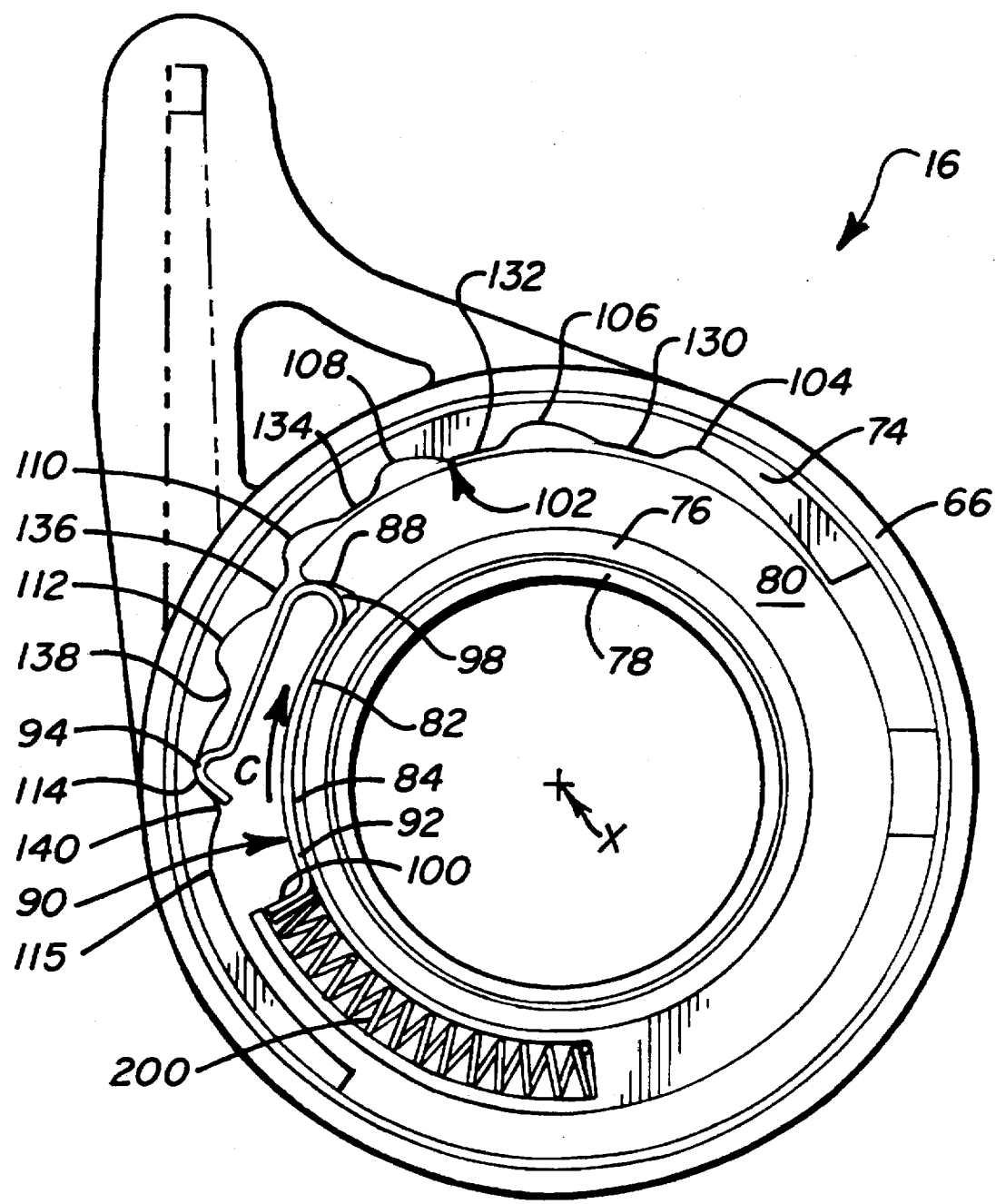
FIG. 10 is a cross-sectional view of an assembled shift actuator, taken substantially along line 9—9 of FIG. 4, illustrating an additional embodiment of the present invention.

As will be recognized by one skilled in the art, other means in the place of or in addition to ramp 142 can be employed within the slope of the invention to urge spring 90 in a clockwise direction. For example, as illustrated in FIG. 10, a further spring 200 could be provided between end 100 and sidewall 86. The additional spring element could be formed integrally with spring 90 or could be provided as a discrete element.

According to the invention, each of the detents 104–115 is associated with a sprocket center position of a respective sprocket on the rear derailleur freewheel 34. When the rider rotates the rotating member 62 in a counterclockwise direction, the shift actuator 16 will pull the control cable 22, causing the derailleur upper guide wheel 36 to move inboard from the current sprocket beyond the selected sprocket to an overshift position (see FIG. 3b). However, when the rider releases his or her hand from the rotating member 62, the interaction of the ramp 142 and the spring 90 will cause the rotating member 62 to rotate back in a clockwise direction (arrow C) for a predetermined distance. Since the rotating member 62 is rotating in a clockwise direction, a small amount of control cable is released and the derailleur will assume a sprocket center position relative to the new selected sprocket (see FIG. 3c).

The operation of the shift actuator can best be discerned with reference to FIGS. 11–18. FIGS. 11–14 particularly illustrate an example of a shift between adjacent sprocket position in which a high amount of overshift is desired. In FIG. 11, the shift actuator 16 is shown in a "sprocket center" position. In this position, the end or shoulder 98 of the detent spring 90 abuts the sidewall 88. The other end 100 of the spring 92 is completely disengaged from the ramp 142. The indexing projection 94 is in registry with depression 114.

Referring now to FIG. 12, when the rotating member is rotated by the rider in a counterclockwise direction as seen in FIGS. 12–13, the detent circle 74 will rotate counterclockwise also as it is affixed with respect to the exterior grip. In this state, the shifter 16 is pulling cable. The indexing projection 94 leaves the detent 114 and begins to ascend the down-shifting slope of the detent 114. The slope is sufficiently acute that the entire spring 90 will be displaced in a counterclockwise direction such that the spring end 100 abuts sidewall 86; in this position, the end 100 has ascended the ramp 142 and an additional amount of compressive force is placed on the spring 90.

In FIG. 13, the rotating member of the shift actuator 16 has been rotated further in a counterclockwise direction. The rotation continues until crest 138 is passed; the indexing projection 94 then descends a detent slope and registers with the next detent or depression 112. In FIG. 13, the hand of the rider is still engaging the elastomeric grip of the rotating member, and end 100 is still in abutment with sidewall 86 such that the spring 90 is in engagement with the ramp 142.

In FIG. 14, the rider has released the rotating member of the shift actuator. Without the torque applied by the rider's hand, the clockwise torque derived from ramp 142 predominates. Ramp 142 pushes end 100 of the spring 90 in a clockwise direction until end 100 clears the ramp 142 and until the shoulder 98 abuts the sidewall 88 of the spring receptacle 82. Because the spring 90 moves in a clockwise direction and the indexing projection 94 is detented with depression 112, the detent circle 74 moves with it and with spring 90, the entirety of the rotating member 62. A small portion of cable is thus released, helping to return the rear derailleur from an overshift position to a sprocket center position. In this high overshift example, the amount of cable released in the overshift return is a function of the difference in lengths between the base 92 of spring 90 and the length of the receptacle 82.

FIGS. 15–18 are sectional views taken successively in time to illustrate a "low overshift" example—a shift where only a small amount of overshift and a small amount of overshift return are required to attain a sprocket center position on the newly selected sprocket. FIG. 15 shows the indexing projection 94 in registry with depression 106, which corresponds to the next-to-largest sprocket on the freewheel 34 (see FIG. 1). The shoulder or pivot 98 of the spring 90 is in abutment with the sidewall 88 of the spring receptacle 82. Opposed end 100 of the spring 90 is in complete disengagement from the ramp 142. In this position, the derailleur will be "sprocket center" in relation to the sprocket corresponding to depression 106.

In FIG. 16, the rider begins to turn the rotating member in a counterclockwise direction. In response, the indexing projection 94 begins to ride up out of depression 106 along its gradual "downshifting" slope. Spring end 100 will ascend receptacle ramp 142 to apply further compressive force to the spring 90. End 100 will come into contact with sidewall 86.

As the indexing projection 94 moves off of the "downshift" slope of the depression 106, it will begin to engage plateau or land 130. At this point, the spring 90 will be launched, without further motive force being supplied by the counterclockwise torque of the rider's hand, across the land 130 and will come into registry with the succeeding depression 108. Since the rider did not have to rotate the shift actuator any further to get this clockwise movement of the spring relative to the detent circle, the amount of cable pulled will be commensurately reduced, thus reducing the amount of overshift. In other words, the depression or detent 108 is reached at an earlier moment than would have otherwise occurred because of land or plateau 130. The spring 90 is moved across the land or plateau 130 because the interaction of ramp 142 with end 100.

As shown in FIG. 17, the spring end 100 is now in engagement with the ramp 142 and the shoulder 98 of the spring 90 is proximate wall 88. This designates the amount of overshift return which is left. When the rider releases the rotating member as shown in FIG. 18, the rotating member will shift slightly in a clockwise direction until the end 100 comes completely off the ramp 142. Thus, only a small amount of overshift return takes place.

The illustrated embodiment is a cylindrical shift actuator preferably installed coaxial to a handlebar, in which the grip is rotated around a mandrel. The present invention could also be presented in a linear form in which a moving member is slid linearly with respect to a stationary member, and such a linear shift actuator could be mounted on the bicycle frame or handlebar.

In summary, a novel method and apparatus of incorporating and overshift return function into a hand-rotatable shift actuator has been shown and described. The apparatus further has variable overshift return such that the amount of overshift of the attached derailleur can be customized for each individual sprocket on the associated freewheel.

While a preferred embodiment and its advantages have been described in the above detailed description taken in conjunction with the drawings, the present invention is not limited thereto but only by the scope and spirit of the appended claims.

What is claimed is:

1. A hand-operated shift actuator for displacing a bicycle gear shift control cable, comprising:

a mandrel adapted to be affixed in relation to a shifting station of a bicycle accessible to a hand of a rider;

a rotating member adaptable to be rotated by the hand of the rider and disposed radially outwardly of the mandrel, said rotating member including an engagement portion having a plurality of depressions on an inner surface of said rotating member;

a detent spring having a base and an indexing projection for registry with said rotating member engagement portion;

a receptacle formed in said mandrel for receiving said base of said spring, said receptacle having a floor with a length between opposed sidewalls thereof, a length of said spring being less than said length of said receptacle floor;

said spring engaged in compression between said inner surface and said receptacle floor, a ramp of said floor including a first end at a first distance away from said inner surface of said rotating member and a second end at a second distance away from said inner surface, said first and second distances being unequal, said base engaging said ramp when said rotating member is rotated in a predetermined direction until a desired depression registers with said indexing projection, said ramp urging said spring base, said indexing projection and said rotating member in a direction opposite said predetermined direction for a predetermined distance upon release of said rotating member by the hand of the rider.

2. The shift actuator of claim 1, wherein said first end of said ramp is closer to said inner surface of said rotating member than said second end thereof, said first end adjoining a sidewall of said cavity.

3. The shift actuator of claim 1, wherein said inner surface of said rotating member further includes at least one flat disposed between adjacent ones of said engagement portion depressions, said ramp of said cavity floor coacting with said flat whereby when said indexing projection of said spring is registered in a first of said adjacent ones of said depressions and said rotating member is rotated in the direction of a second of said adjacent ones of said depressions, said indexing projection will move out of registration with the first of said adjacent ones of said depressions, and said indexing projection will then move across said flat to said second one of said adjacent ones of said depressions without further impetus from said rotating member.

4. The shift actuator of claim 3, wherein said flat comprises an arcuate segment of said inner surface of said rotating member having a substantially constant radius as measured from an axis of said rotating member.

5. The shift actuator of claim 3, and further comprising a plurality of flats between respective ones of said plurality of depressions.

6. The shift actuator of claim 5, wherein the lengthwise extent of said flats varies among said flats, whereby the amount of overshift between adjacent sprocket positions is reduced as a function of the lengthwise extent of the flat moved across by said indexing projection.

7. A hand-rotatable shift actuator for displacement of a derailleur control cable, comprising:

a stationary member;

a rotatable member disposed around said stationary member;

a detent spring having a base and an indexing projection springedly connected to said base, a cavity of said stationary member adaptable to receive said base, a length of said base being less than a length of said cavity such that said base is movable in said cavity;

an inner surface of said rotatable member in spaced opposition to said stationary member and having a plurality of spaced-apart depressions formed therein, a plurality of lands disposed between respective adjacent ones of said depressions; and said indexing projection adaptable to be in registry with any selected one of said depressions, said indexing projection being forced out of a current depression responsive to rotation of said rotating member in a first direction onto an adjacent land, means for urging said detent spring in a second direction opposite said first direction such that said indexing projection will move across the last said land to a next depression without impetus from said rotating member.

8. The shift actuator of claim 7, wherein said lands are of different lengths.

9. The shift actuator of claim 7, wherein each said land comprises a concavely arcuate segment of substantially constant radius as measured from an axis of said rotating member.

10. A derailleur gear shifting system for a bicycle, comprising:

a freewheel having a plurality of sprockets, a drive chain engaging a selected one of said sprockets;

a derailleur mounted adjacent said freewheel and movable to shift said drive chain between selected ones of said sprockets;

an elongated flexible control cable having a first end coupled to said derailleur and a second end, lengthwise displacement of said control cable causing shifting of said derailleur from a current sprocket position to a selected sprocket position;

a hand-rotatable shift actuator for mounting at a shifting station on the bicycle within reach of a rider's hand, a fixed member of said shift actuator affixed in relation to said shifting station, a rotating member of said shift actuator rotatable about said fixed member, an inner surface of said rotating member having a plurality of depressions each corresponding to a respective sprocket of said freewheel, rotation of said rotating member causing lengthwise displacement of said derailleur control cable;

a detent spring having a base and a radially outwardly projecting indexing projection for registry with a selected one of said depressions;

a cavity formed within said fixed member for receiving said base of said spring, said cavity having a floor with a length between opposed sidewalls thereof, a length of said spring being less than said length of said cavity floor;

said spring engaged in compression between said inner surface of said rotating member and said cavity floor, a ramp of said floor including a first end at a first distance away from said inner surface of said rotating member and a second end at a second distance away from said inner surface of said rotating member, said first and second distances being unequal, said base engaging said ramp when said rotating member is rotated in a predetermined direction until a desired depression registers with said indexing projection of said spring, said ramp urging said spring and said rotating member in a direction opposite said predetermined direction for a predetermined distance upon release of said rotating member by the hand of the rider.

11. The system of claim 10, wherein said inner surface of said rotating member further includes at least one flat disposed between adjacent ones of said depressions, said ramp of said cavity floor coacting with said flat whereby when said indexing projection of said spring is registered in a first of said adjacent ones of said depressions and said rotating member is rotated in the direction of a second of said adjacent ones of said depressions, said indexing projection will move out of registration with the first of said adjacent ones of said depressions, and said indexing projection will then move across said flat to said second one of said adjacent ones of said depressions without further impetus from said rotating member.

12. The system of claim 11, wherein said flat comprises an arcuate segment of said inner surface of said rotating member having a substantially constant radius as measured from an axis of said rotating member.

13. The system of claim 11, wherein said flats are of different lengths.

* * * * *

UNITED STATES PATENT AND TRADEMARK OFFICE
CERTIFICATE OF CORRECTION

PATENT NO. : 5,676,020  
DATED : October 14, 1997  
INVENTOR(S) : Brian Jordan and Sam Patterson It is certified that error appears in the above-identified patent and that said Letters Patent is hereby corrected as shown below:

In the Abstract, line 9, after "104-" delete "114" and insert therefore --115--.

In Colume 4, line 28, after "(see FIG. 1);" delete "rear" and insert therefore --front--.

In Colume 4, line 29, after "the" delete "from" and insert therefore --front--.

In Colume 5, line 64, after "104-" delete "114" and insert therefore --115--.

In Colume 8, line 30, after "sion" delete "108" and insert therefore --104--.

In Colume 8, line 35, delete first number on line "108" and insert therefore --104--.

Signed and Sealed this

Twenty-fourth Day of February, 1998

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,676,020

DATED : October 14, 1997

INVENTOR(S) : Brian Jordan and Sam Patterson

Page 2 of 2

It is certified that error appears in the above-identified patent and that said Letters Patent is hereby corrected as shown below:

In the drawings, Sheet 11, Figs. 17, 18, reference number "108" should be replaced with reference number "104".

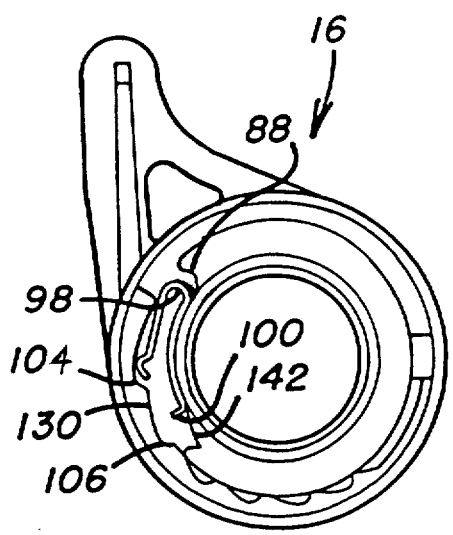
FIG. 17

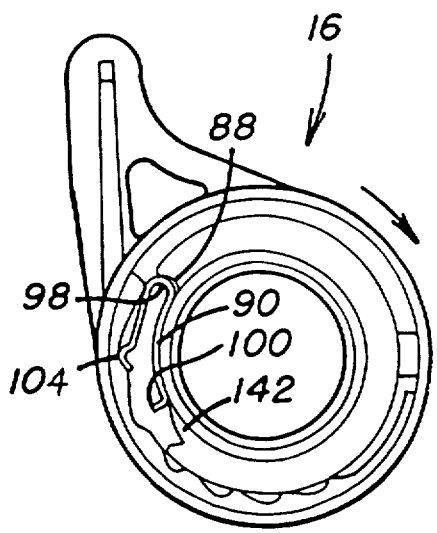
FIG. 18